US006348119B1

(12) United States Patent
Leonte et al.

(10) Patent No.: US 6,348,119 B1
(45) Date of Patent: Feb. 19, 2002

(54) METHOD FOR BONDING WOOD AND OTHER COMPOSITE MATERIALS USING AN ELECTRIC CURRENT

(76) Inventors: Oana M. Leonte, 1137 Walpert St., #69, Hayward, CA (US) 94541; Lev V. Ginzburg, 6613 Central Ave., El Cerrito, CA (US) 94530; Robert S. de Heer, 24 Corte del Rey, San Rafael, CA (US) 94903

( * ) Notice: Subject to any disclaimer, the term of this patent is extended or adjusted under 35 U.S.C. 154(b) by 0 days.

(21) Appl. No.: 08/241,688

(22) Filed: May 12, 1994

Related U.S. Application Data

(63) Continuation of application No. 08/054,855, filed on Apr. 28, 1993, now abandoned.

(51) Int. Cl.$^7$ .............................................. B32B 31/00
(52) U.S. Cl. ................. 156/273.9; 156/62.2; 156/275.5; 156/275.7
(58) Field of Search ........................... 156/272.2, 273.9, 156/274.4, 274.8, 275.5, 275.7

(56) References Cited

U.S. PATENT DOCUMENTS

| | | | | |
|---|---|---|---|---|
| 2,393,100 A | * | 1/1946 | Gallay et al. | |
| 2,407,833 A | * | 9/1946 | Jablonsky | |
| 3,291,671 A | * | 12/1966 | Hecht | 156/274.4 |
| 3,523,049 A | * | 8/1970 | Putnam | 156/274.8 |
| 3,668,286 A | * | 6/1972 | Brooks et al. | 264/26 |
| 4,043,047 A | * | 8/1977 | Galliker | 204/149 X |
| 4,420,357 A | * | 12/1983 | Neubauer et al. | 156/274.4 X |

FOREIGN PATENT DOCUMENTS

| GB | 0562892 | * | 7/1944 | 156/274.8 |
|---|---|---|---|---|

OTHER PUBLICATIONS

Gallay and Graham, "A New Gluing Process," 1943 Modern Plastics, pp. 126–129, 168, 170, 172.*
Alfred W. Christiansen, How overdrying wood reduces its bonding to phenol–formaldehyde adhesives: a critical review of the literature. Part I. Physical responses. (For. Prod. Lab. For. Serv., Madison, WI 53705–2398 USA). Wood Fiber Sci. 1990, 22(4), 441–59. Abstract.*
Fuda, Hiroyuki; Tsunoda, Noriyuki; Yoshikawa, Toyosuke, "Electrically conductive adhesives," (Hinode Chemical Industry Co., Ltd.) Jpn. Kokai Tokkyo Koho JP 63 43,982 [8843,982] (Cl. C09J3/00), Feb. 25, 1988, Appl. 86/186,768, Aug. 11, 1986, 5 pp. Abstract.*
Matsumoto, Tadashi, "Electrically conductive adhesives," (Matsushita Electric Works, Ltd.) Japan. Kokai 74,101,415 (Cl. 24(5)A03, 24(5)A011), Sep. 25, 1974, Appl. 72 118, 789, Nov. 27, 1972; 3 pp. Abstract.*
Adamca, Martin, "Investigation on electric conductivity of adhesive in bonding of wood by radio frequency heating," (Statny Drev. Vysk, Ustav, Bratislava, Czech). Drev. Vysk, 1973, 18(4), 251–70 (Slo). Abstract.*

* cited by examiner

Primary Examiner—Curtis Mayes

(57) ABSTRACT

A method, a system and a product made therefrom including the steps of providing electrically non-conductive pieces or fragments, causing at least a portion of the electrically non-conductive pieces or fragments to become temporarily electrically conductive, combining adhesive which sets when sufficient heat is applied thereto with the temporarily electrically conductive pieces or fragments, and applying voltage across the temporarily electrically conductive pieces or fragments and adhesive combination so as to produce an electric current through the temporarily electrically conductive pieces or fragments which, in turn, generates heat within the temporarily electrically conductive pieces or fragments and adhesive combination.

7 Claims, 3 Drawing Sheets

METHOD FOR BONDING WOOD AND OTHER COMPOSITE MATERIALS USING AN ELECTRIC CURRENT

This is a continuation of application Ser. No. 08/054,855 filed Apr. 28, 1993, now abandoned.

FIELD OF THE INVENTION

The present invention relates to composite structural products, and more particularly relates to a system and a method for manufacturing composite structural products out of reinforcing materials such as wood, plastic, ceramics, cloth, glass and concrete wherein an adhesive is used to bond together pieces, fibers or fragments of the reinforcing materials.

BACKGROUND OF THE INVENTION

Many structural products are made by bonding together pieces or fragments of materials to make a larger piece. In the wood bonding industry, a common wood-composite-board manufacturing process includes drying wood chips or veneers, applying adhesives and forming the final product in a cold press and/or a hot press. Typically, wood pieces or fragments and heat curable adhesive are combined and heat and pressure is applied to the combination to set the adhesive.

In many processes both cold presses and hot presses are used. First, cold presses are used to prepress the material in a manner sufficient for handling while hot presses are then used to set the adhesive. Because cold pressing provides sufficient consolidation or bonding to permit handling of panels (plywood and beams), prepressed laminates or consolidated panels may be stored for a few minutes to hours before they are finally subjected to high heat and pressure to set the adhesives.

Synthetic resins that are predominately used in the manufacture of plywood, particle board and fiberboard bonding, for example, are set in hot presses at temperatures of between 110 to 205° C. for 3 to 8 minutes depending on the type of wood and adhesive. Electric coils, high frequency current, steam and oil or gas have all been used to heat the press platens or materials to be bonded. Pressure is then applied to a panel by engaging a series of hydraulic pistons and rams or other means of applying pressure. Also, high frequency electric fields or radio waves have been used to excite particles in the adhesive, thus causing heat to be generated within the adhesive for curing. These systems have extensive equipment requirements and thus are expensive and cumbersome.

Curing or setting the adhesive in the manner described above, requires that the wood or other material have a low moisture content, typically between two (2) and eight (8) percent. However, because most wood is reduced to pieces or fragments before it has been dried, its moisture content is between thirty (30) and sixty (60) percent. In the wood products industry, wood having a moisture content as described is referred to as green, or freshly cut wood. Traditionally, the reason the starting materials prior to pressing are between 2–8% moisture is to speed up press times. For example, heat barriers form in moist wood which in turn slows heat transfer to the core region during the pressing step, thus slowing the pressing process.

In order to remove the excess moisture from the green wood, the wood is subjected to temperatures as high as 870° C. in drying kilns which are commonly fueled by natural gas, propane oil or incinerated scrap wood and wood residues. Depending upon the initial moisture of the green wood, the drying time can extend several hours. Moreover, as the wood nears the target moisture content, the drying process becomes more energy and time consumptive. Also, due to the length of time the wood spends in a dryer during a typical processing operation, dryer capacity becomes a limiting factor in efficiency of the overall wood-bonding process.

As mentioned above, hot pressing is used to set adhesive to bond fibers or filler together to form a larger piece. Hot press platens are forced against the longitudinal sides of the board to be formed. The applied heat is therefore transferred from outside the board to inside the board. In manufacturing wood and other composite products, because of the low thermal transfer properties of wood and other composite elements, the composite boards generally have to be heated for two minutes after the center layer of the board reaches 100–180° C. since the heat transferred from the hot press platens to the inner regions of composite board materials is slow. The low thermal transfer properties thus cause the outer portions of the composite boards to be frequently overheated while the inner layers may be underheated. Therefore, in the use of hot press platens, not only is energy wasted by unnecessary heating thermally insulating substrates and by the loss of heat to the ambient environment, but the outer portions of the composite board can be damaged since they are subjected to excessive heat which may lead to warpage.

As an example, the manufacture of plywood illustrates the inefficiency of existing manufacturing means. Layered veneers are pressed between heated platens for three to eight minutes. When the veneers are heated to requisite temperatures of 145 to 205° C., the substrates partially degrade in the heat. Furthermore, loading and curing times of hot presses cause major bottlenecks in plywood manufacture.

SUMMARY OF THE INVENTION

The present invention provides a system and a method which avoids the necessity of nearly completely drying out the wood pieces or fibers prior to their combination with adhesives. Also avoided may be the necessity of using hot press platens to set the adhesives for bonding together wood pieces or fibers. In regard to high frequency bonding equipment, the complicated and cumbersome equipment requirements are avoided by using a system method of the present invention. By causing otherwise electrically non-conductive pieces or fragments of wood, including green wood, to become temporarily electrically conductive in the manner described below, these pieces or fragments can be used as part of an efficient, economical and rapid process of heating and thereby setting or curing the cooperating adhesives. More specifically, an electric current is caused to flow through the temporarily conductive fragments of wood to generate heat for setting or curing the adhesive. This, in turn will result in a more efficient method and system of making composite structural products where the capacity of a new or existing processing plant can be increased substantially while processing equipment requirements can be reduced considerably.

The present invention also includes a product made by the steps of providing electrically non-conductive reinforcing pieces, fibers or fragments of wood, in their natural, in a treated or a synesthetic form, causing the electrically non-conductive pieces or fragments to be temporarily electrically conductive, combining adhesive which sets when sufficient heat is applied thereto with the temporarily electrically conductive pieces or fragments, and applying voltage across the temporarily electrically conductive pieces or fragments and adhesive combination so as to produce an electric current through the temporarily electrically conductive pieces or fragments which, in turn, generates heat within the temporarily electrically conductive pieces or fragments and adhesive combination.

DESCRIPTION OF THE PREFERRED EMBODIMENT

Figure 1:
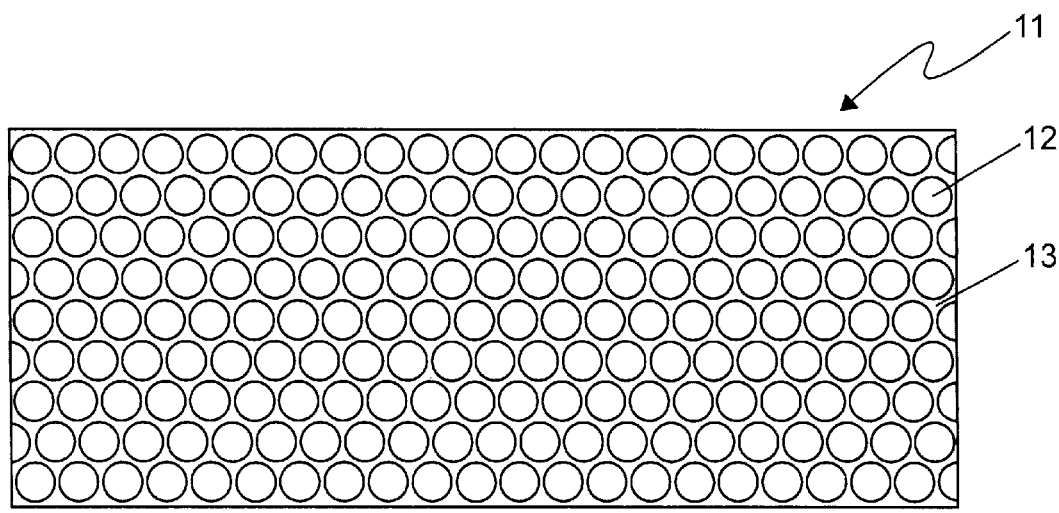
FIG. 1 depicts pieces or fragments of wood combined with adhesive to form a larger piece.

As discussed above and as illustrated in FIG. 1, reinforced structural products 11 are manufactured by combining pieces or fragments of wood 12 together with heat curable adhesive 13 to form larger pieces and applying heat thereto to set the adhesive. Depending upon the type of wood product, different sized and shaped pieces or fragments can be used. For example, in particle board, the size and shape of the pieces or fragments are on the order of 1 by 1 by 1 mm or 300 by 30 by 1 mm, or 5 by 5 by 2400 mm. On the other hand, to form plywood, the pieces are in the form of veneers and are generally 4 ft. by 8 ft.

In the present invention, wood pieces or fragments which are combined with electrolytes are also combined with an adhesive. Since the wood is porous, contains moisture and is absorbent, at least a portion of the wood pieces or fragments (most notably, surface regions) is able to absorb the electrolytes, thus becoming electrically conductive and therefore providing a path for current to pass through the wood. A range of resistivity per unit area could be between approximately 0.01 to $10^2$ ohms·cm depending upon the starting materials used. Accordingly, the electrical conductivity of otherwise electrically non-conductive wood pieces or fragments is temporarily provided so that when applying a voltage across the material and adhesive combination, even a DC voltage, an electric current is generated and passes through at least a portion (such as the surface portion) of the pieces or fragments which in turn, generates Joule's heat in an amount sufficient to cure the adhesive. High moisture content of the wood particles facilitates spreading and penetration of the adhesive into the wood pores which leads to better mechanical bonding. Because the adhesive penetrates the wood more easily, and because the heat generating current heats the region where the adhesive structural fiber interface faster and contemporaneously and throughout the entire panel, better bonding is achieved than in the prior art process.

In the manufacture of wood products in accordance with this invention, the wood moisture content is preferably between approximately 8–25% but may be as high as desired. Therefore, in some cases pre-drying is not required at all. By combining normally electrically non-conductive high-moisture wood pieces with electrolytes or a solution containing electrolytes, the moisture within the wood combines with the electrically conductive substance, thus at least temporarily changing the electrical conductivity characteristics of the wood, and at most permanently changing the woods electrical conductivity properties.

The advantages of using high-moisture bonding in the manufacture of structural composite wood products are several fold. Avoided are the results typical of overdrying such as "blue haze" emissions, dryer fires, stack fires of pressed panels and high energy requirements. Therefore, avoided is the necessity to purchase expensive pollution control equipment. Also, because less moisture is drawn out of the green wood, the time wood spends in the dryer is also reduced, thus making the manufacture of reinforced structural products more time efficient.

The electrolytes are initially added to the wood as dry crystals or in the form of an electrolytic solution. Alternatively or in combination therewith, the electrolytes are first combined with adhesive so that the moisture or combination is subsequently applied to the wood pieces or fragments, in which case some of the electrolytes and the adhesive are absorbed by the wood pieces or fragments.

In an embodiment of this invention using small enough pieces, the material, the electrolytes and the adhesive are held in a container (not shown), and the combination forms a slurry. To form plywood, the adhesive and electrolytes are spread between veneers. The amount of electrolytes to adhesive varies according to the inherent conductiveness of the adhesive and the type of materials to be bonded together. In the manufacture of particle board, the amount of electrolytes to wood is approximately 0 to 20 percent. Moreover, the amount of adhesive to wood is approximately 1 to 15 percent. In some instances, up to 20% or more of the thermosettable resin or adhesive can be substituted with an electrolyte. In any event, a sufficient amount of electrolyte must be provided to adequately saturate the wood so that the latter is sufficiently electrically conductive to support the flow of a sufficient amount of current to generate the required heat to set or cure the adjacent adhesive. With present invention, it may be necessary to wait for several seconds to several minutes for the electrolyte solution to penetrate particles, depending on their size and desired depth of penetration. Based on the teachings herein, this can be readily determined depending on the wood and adhesive in question. Furthermore, some woods have electrolytes in them that will make the wood conductive providing they contain enough water. For example, tannic acid as present in oak and lignocellulosic materials.

Conductivity can be electronic or ionic or a combination of both. Enumerable types of electrically conductive substances can be used in accordance with the present invention. For example, some which can be used individually or in combination include metallic salts (mono-, di- or trivalent) of organic or inorganic acids such as chloride, sulfate, phosphate, acetate, oxalate, organic and inorganic acids or bases; polyelectrolytes; fillers such as graphite (natural, natural exfoliated, or synthetic), carbon black, metallic powders, fibers or flakes; electroconductive polymers; crystalline conductive charge transfer complexes; wax emulsions; and other feasible means.

The adhesive used, of course, depends upon the type of wood to be reinforced. The adhesive can include any one of those which is currently in use in powder or liquid form, including formaldehyde-based adhesives such as urea, phenol, amine, resorcinol, melamine; tannin and lignin based adhesives; di, tri and polyisocyanates; poly vinyl acetate; epoxies; thermoplastic resins; and any other natural or synthetic adhesive or binder such as blood and hide adhesive or binder; or any binding systems.

Once the pieces or fragments, the electrolytic substance and the adhesive are combined in amounts sufficient to cause the pieces or fragments to become electrically conductive, a board shape (or other shape) is formed by prepressing. At this stage, a voltage is applied across the board to produce a current though the prepressed composite material for heating and thereby curing the adhesive. Thus, the need for a hot press, in many applications, is obviated because the curing is completed in the cold prepress.

Figure 2:
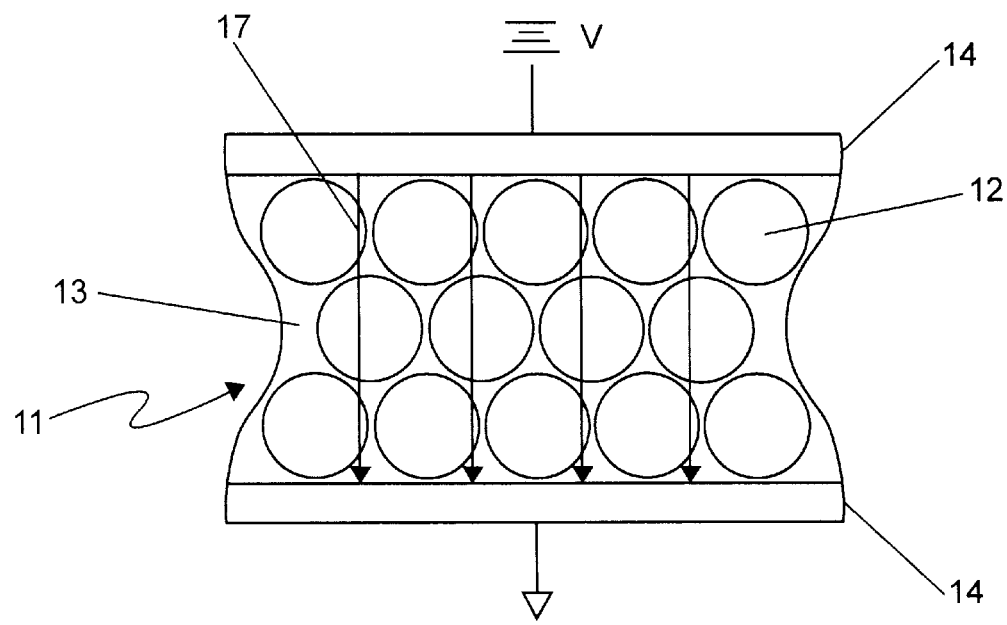
FIG. 2 illustrates press platens being used to transfer electrical current through the temporarily conductive pieces or fragments of wood which are pressed together to form, for example, particle board.

For an illustration of the system for forming particle board in accordance with the present invention, attention is directed to FIG. 2. There, press platens 14 which have a voltage difference between them, are being used as electrode plates to transfer electrical energy through the temporarily conductive pieces or fragments 12 of wood which are pressed together to form particle board. In accordance with the present invention, the current 17 is shown passing through the wood fragments 12 as a voltage is applied thereto.

The direction in which the current travels through the wood product is decided by determining the shortest dimensions transversed by an adhesive film. For example, because the shortest dimension of particle board that is transversed by an adhesive binder is its thickness, electricity is supplied to the press platens across this dimension and thus, the entire longitudinal surfaces of the board are the electrical contact faces. For plywood, the current is applied to the glue line at the edge of the board.

Figure 3:
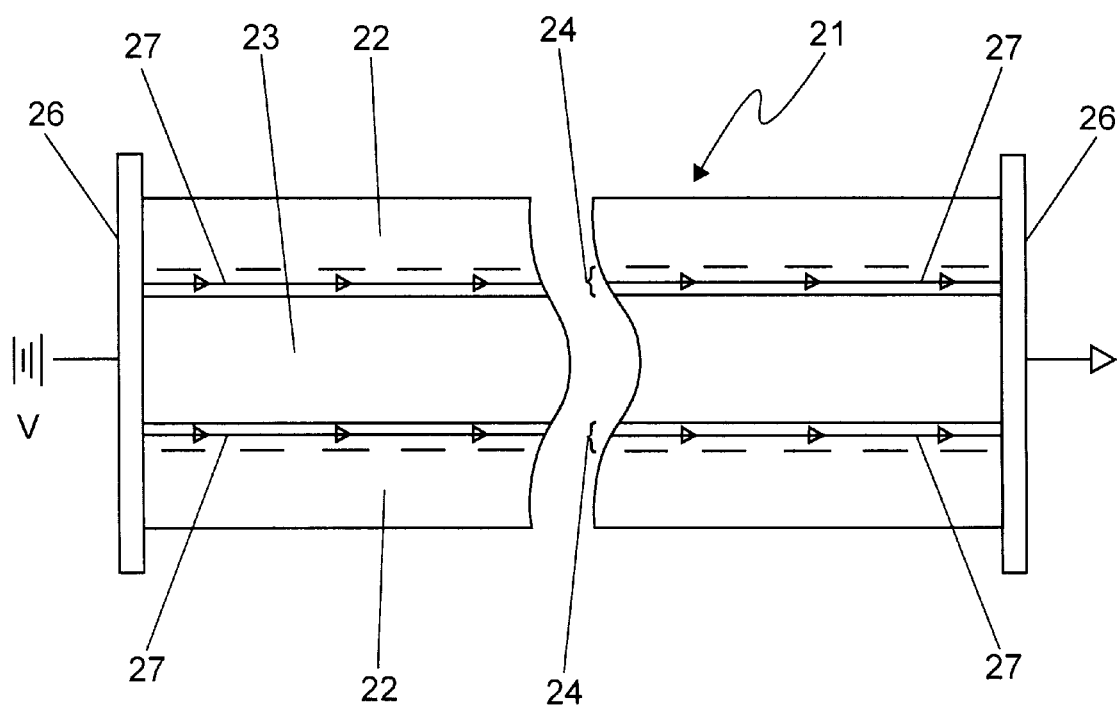
FIG. 3 illustrates a portion of the veneers of plywood which have become temporarily electrically conductive so that current can pass therethrough.

For an illustration of the system for forming plywood 21 (or similarly, laminated beams) in accordance with the present invention, attention is directed to FIG. 3. Two veneers 22 are shown with an adhesive and electrolyte combination 23 between them which is absorbed through the inner surfaces of the veneers and thus causes region 24 to become temporarily conductive. There, electrical contacts 26, in the form of electrodes having a voltage difference between them, are positioned at the opposite edges of the plywood 21 and used to transfer electrical energy through the temporarily conductive regions 24 of the wood. In accordance with the present invention, the current 27 is shown passing through the electrolyte saturated regions 24 as a voltage is applied thereto.

Figure 4:
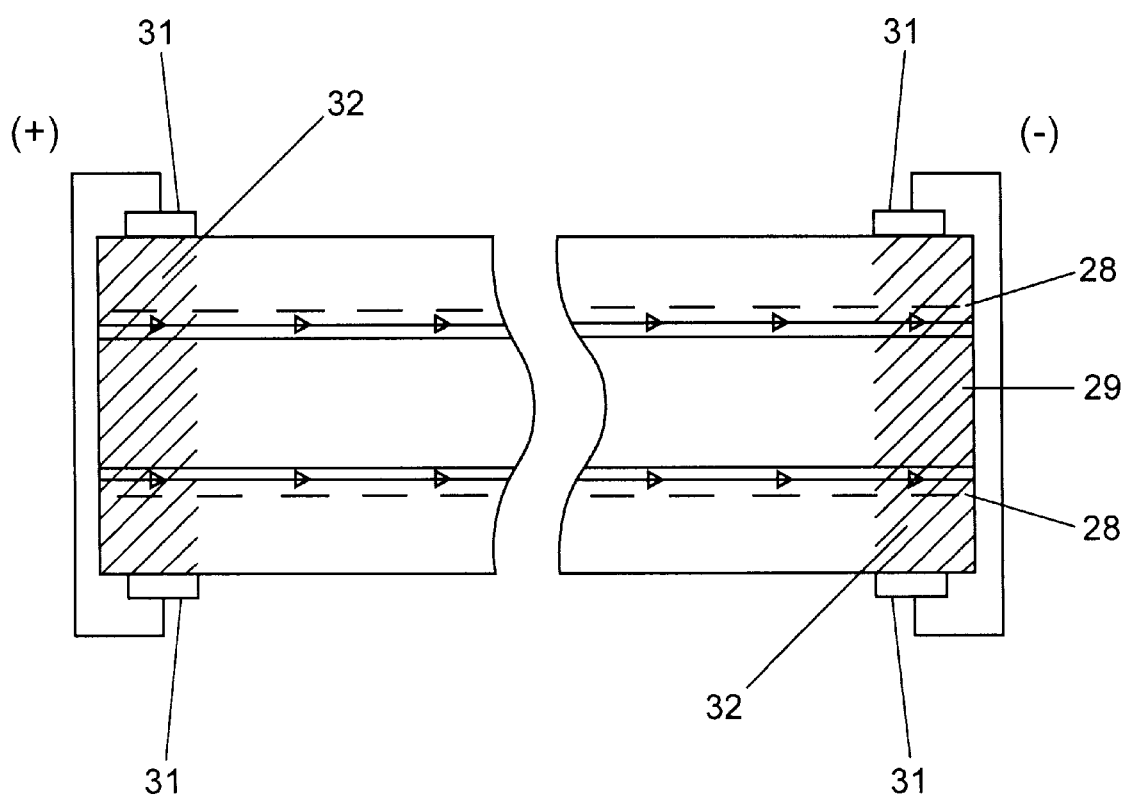
FIG. 4 illustrates a second embodiment of the system of the present invention to manufacture plywood.

Thin veneers may also be laminated by making the material conductive at the edge, and applying a current of the same potential at the top and bottom of a particular side, as shown in FIG. 4. Wood veneers 28 are separated and bonded by adhesive 29. Electrodes 31 at the top and bottom of each side can be used when the wood products are saturated at their ends 32 (indicated by shading) by electrolytes to a sufficient degree to allow the current to pass therethrough. For laminated beams, the shortest dimension varies from a few inches to a few feet.

By adjustments of the applied voltage, temperature can be controlled manually or automatically so that uniform high temperatures within the board can be reached almost instantaneously or slowly. Also, moisture and conductivity measurement equipment can provide information thus providing the ability to automatically adjust electrical parameters. Thus, since the adhesives are heated evenly throughout the panel and regional overheating and underheating of panels is reduced, the internal tensions in the panels are reduced and the overall quality of the goods is improved.

Many advantages flow from the present invention's ability to avoid the use of the hot press platens. In some cases personnel for moving boards from the cold presses to the hot presses is avoided when hot presses are not used. Furthermore, because the hot presses cause overheating, and thus excessive steam or smoke, the pollutant formaldehyde and other volatile organic compounds which are otherwise released into the environment are reduced by not using hot presses.

As currently used in the structural reinforced materials industry, other substances can be added to the wood pieces or fragments along with the electrolytes and adhesive to improve their performance characteristics and function as conductors. Other substances include curing accelerators such as metallic salts or oxides or acids; thermal stabilizers or fillers such as $Al_2O_3$, $SiO_2$, as aerosols, MgO, $AlPO_4$ or other phosphate, or phosphorous molybdates; extenders such as wheat or vegetable flour; hardeners; additional polymers or surfactants for aid in homogeneous blending of additives; and anti-microbial additives.

While the present invention has been described with reference to wood products, the same method and system can be used to bind any material which can absorb the electrolytes at least partially. While porosity of the materials is not necessary, reinforcing materials, such as concrete, ceramics, cloth, plastics, glass fibers, kevlar fibers, and other synthetic or natural fibers are examples of materials which can be caused to become temporarily conductive. Accordingly, any dielectric reinforcing material can be used in accordance with the present invention and products made by the method and system described herein include other reinforcing materials. In this regard, it is to be noted that the actual pieces or fragments, apart from the electrolytic moisture, does not become conductive but takes on an electrically conductive characteristic in combination with the electrolytic moisture or other solvent which forms temporary but essential component of the pieces or fragments.

In the present invention, the use of the interstitial wood (or other starting material) moisture or other diluent for electrolytes, provides a method and a system for causing otherwise electrically non-conductive pieces or fragments to become temporarily electrically conductive. When the electroconductive material is combined with adhesive and electric current is passed therethrough, Joule's heat is generated, thereby setting the adhesive. The present invention can be extended to similar approaches for solid casting and coating applications. In the wood products industry, the high-moisture bonding of the present invention provides advantages including: less energy and time are spent drying green wood and therefore, the volume of production is increased; expensive pollution-emission equipment may be obviated since dryers are run at lower temperatures and curing times may be reduced from minutes to seconds; and panels made in accordance with the present invention are more dimensionally stable when pressed closer to ambient humidity and drying and pressing times can be decreased by over 80% of that of the prior art.

What is claimed is:

1. In the manufacture of reinforced structural products, a method comprising the steps of:

providing irregular shaped, electrically non-conductive pieces;

causing said electrically non-conductive pieces to become temporarily electrically conductive by combining said pieces with an electrolytic solution which is added to said electrically non-conductive pieces in a way which causes said electrically non-conductive pieces to become electrically conductive;

thereafter combining the electrically conductive pieces with said adhesive which sets when sufficient heat is applied thereto with said temporarily electrically conductive pieces; and applying voltage across said temporarily electrically conductive pieces and adhesive combination so as to produce an electric current through said temporarily electrically conductive pieces which, in turn, generates heat within said temporarily electrically conductive pieces and adhesive combination.

2. A method as recited in claim 1 wherein said electrically non-conductive pieces are wood products.

3. A method as recited in claim 2 wherein said wood products have a moisture content above approximately eight percent.

4. A method as recited in claim 1 wherein said electrically non-conductive pieces are reinforcing materials.

5. A method as recited in claim 1 wherein after applying said electrical current to said temporarily electrically conductive pieces and adhesive combination, said method comprises the further step of applying additional heat by means of a heat press, thereby setting said adhesive and thus hardening and reinforcing said pieces into a solid structure.

6. In the manufacture of a particle board from electrically non-conductive structural, irregular-shaped reinforcement pieces dispersed throughout the board and thermally settable or curable adhesive, a method comprising the steps of:

selecting reinforcement pieces which are capable of absorbing and retaining moisture;

combining said reinforcement pieces with sufficient moisture and a sufficient quantity of electrolytic medium so as to cause said reinforcement pieces to become electrically conductive apart from any of said adhesive that might or might not be absorbed by said reinforcement pieces;

combining said electrically conductive pieces with said adhesive so as to form a board with the pieces dispersed throughout the board; and applying voltage across said combination of electrically conductive pieces and adhesive so as to produce an electric current through said pieces which, in turn, generates heat within the combination sufficient to set or cure said adhesive.

7. A method as recited in claim 6 wherein said replacement pieces comprise pieces of wood and wherein the moisture content of the wood pieces, as initially provided, is above approximately 8%.

* * * * *